United States Patent [19]
Pilat et al.

[11] Patent Number: 4,873,652

[45] Date of Patent: Oct. 10, 1989

[54] METHOD OF GRAPHICAL MANIPULATION IN A POTENTIALLY WINDOWED DISPLAY

[75] Inventors: John Pilat, Hopkinton; David Keating, Holliston; Wayne Colella, Newton, all of Mass.

[73] Assignee: Data General Corporation, Westboro, Mass.

[21] Appl. No.: 273,627

[22] Filed: Nov. 27, 1988

Related U.S. Application Data

[63] Continuation of Ser. No. 80,185, Jul. 27, 1987, abandoned, which is a continuation of Ser. No. 623,908, Jun. 25, 1984, abandoned.

[51] Int. Cl.⁴ .......................... G06F 3/14; G09G 1/02

[52] U.S. Cl. .................................... 364/518; 364/521; 340/750; 340/724

[58] Field of Search ................ 364/518, 521; 340/723, 340/724, 726, 747, 749, 750

[56] References Cited

U.S. PATENT DOCUMENTS

| | | | |
|---|---|---|---|
| Re. 31,200 | 4/1983 | Sukonick et al. | 364/900 X |
| 4,070,710 | 1/1978 | Sukonick et al. | 364/900 |
| 4,197,590 | 4/1980 | Sukonick et al. | 364/900 |
| 4,316,188 | 2/1982 | Cancasci, Jr. | 340/750 X |
| 4,414,645 | 11/1983 | Ryan et al. | 340/750 X |
| 4,435,779 | 3/1984 | Mayer et al. | 340/747 X |
| 4,451,825 | 5/1984 | Hall et al. | 340/750 |
| 4,471,463 | 9/1984 | Mayer et al. | 340/726 X |
| 4,484,187 | 11/1984 | Brown et al. | 340/750 X |
| 4,531,120 | 7/1985 | Brownell, Jr. et al. | 340/723 |
| 4,533,910 | 8/1985 | Sukonick et al. | 340/724 |
| 4,542,376 | 9/1985 | Bass et al. | 340/723 X |
| 4,549,275 | 10/1985 | Sukonick | 364/518 X |
| 4,550,315 | 10/1985 | Bass et al. | 340/723 X |
| 4,598,384 | 7/1986 | Shaw et al. | 364/521 X |

*Primary Examiner*—Parshotam S. Lall
*Assistant Examiner*—Joseph L. Dixon
*Attorney, Agent, or Firm*—Robert M. Asher; Sewall P. Bronstein

[57] ABSTRACT

A method is disclosed which enhances the ability of digital computer system to manage displays, especially in an environment where a single physical display supports a plurality of logical displays (windows). Machine-language instructions are provided which, in conjunction with user-supplied form descriptors describing each of the windows, enable management and generation of display image data to be performed directly by the processing hardware of the digital computer system, eliminating any need for intervening interpretive software. Data computed from form descriptors may be encached, enhancing the speed of consecutive operations on windows. Graceful creation is enhanced by permitting processing control to escape to software fault handlers.

8 Claims, 12 Drawing Sheets

| | | | | | | |
|---|---|---|---|---|---|---|
| A: GLOBAL | 0,0 | E: GLOBAL | 100,200 | = | LOCAL | -10,-20 |
| B: GLOBAL | 1023,0 | F: GLOBAL | 349,200 | = | LOCAL | 239,-20 |
| C: GLOBAL | 0,499 | G: GLOBAL | 100,349 | = | LOCAL | -10,129 |
| D: GLOBAL | 1023,499 | H: GLOBAL | 349,349 | = | LOCAL | 239,129 |
| | | O: GLOBAL | 110,220 | = | LOCAL | 0,0 |
| | | P: GLOBAL | XG,YG | = | LOCAL | XL,YL |

METHOD OF GRAPHICAL MANIPULATION IN A POTENTIALLY WINDOWED DISPLAY

CROSS-REFERENCE TO RELATED APPLICATIONS

This is a continuation of co-pending application Ser. No. 080,185, filed on 7/27/87 now abandoned which is a continuation of Ser. No. 623,908, filed 6/25/84 now abandoned. There are no related applications.

BACKGROUND OF THE INVENTION

1. Field of the Invention

This invention relates generally to digital data systems, and more particularly to techniques for managing the display of data by such systems in an environment wherein a single display device may provide for a plurality of logical displays functioning independently of each other. Each logical display is known as a "window". Windows may all be displayed concurrently in their entirety, or some windows may be partially or completely covered by other windows.

2. Description of the Prior Art

References:

*Graphics in Overlapping Bitmap Layers,* Rob Pike, ACM Transactions on Graphics, April, 1983.

*SMALLTALK*-80, *The Language and its Implementation,* Adele Goldberg and David Robson, Addison-Wesley, 1983. (Particularly chapters 17, 18, 20.)

Digital data systems have been equipped with display devices almost since their advent. The type of display that has taken preeminence as the most flexible for interfacing with the user is the cathode ray tube display. A recently evolved mode of the use of such displays is to permit several users, several programs, or several processes to share the available space on a display, with each such user, program, or process being allocated a certain amount of display area. Each such area is known as a "window".

Windows, then, may be thought of as independent logical displays co-existing on one physical display. An analogy is several sheets of paper on a desktop; they may be arranged so that all are simultaneously visible, or as they are manipulated some may completely cover (obscure) or partially cover (occlude) others. When obscured or occluded sheets are again uncovered, they still contain all the information that was temporarily invisible.

Windows on a display may likewise be manipulated so that some are sometimes partially or completely invisible on the display—i.e., they present the appearance of being "covered" by other windows. A good embodiment permits the data in windows to be manipulated even while the affected windows or portions of windows are not visible on the screen, with subsequent "uncovering" revealing the manipulations that were performed on a window while invisible.

Windowing has heretofore been accomplished primarily by software. While such an implementation of windowing can provide sufficient capability, it does so at the expense of computational overhead—the user's requests, taking the form of software calls, must go through levels of interpretation by software in order to derive a series of machine-language instructions that the system can execute, even for simple (i.e., unoccluded) windows. Another reason for the severity of this overhead is that the description information (of which there is a much larger amount for a windowed display than for a simple unitary display) must be completely reprocessed every request—there is no architectural provision for retaining the results of previous computations affecting those portions of the display not involved in a current change. As the windowing capabilities are made more sophisticated, this overhead becomes more and more severe.

SUMMARY OF THE INVENTION

The present invention discloses a method of managing displays of a data system which includes memory, a processor, a display, and a display interface. The processor is capable of executing machine language instructions that may directly (i.e., without intervening interpretation by software) manipulate displayed data. The method comprises providing a series of such instructions and providing a set of form descriptors which describe the characteristics of windows on the display. The processor takes each such instruction in turn, associates it with a form descriptor, determines the previous state of the display, and modifies the set of data to which the display interface is responsive to produce the modified display specified by the instruction.

It is thus an object of the present invention to provide an improved data processing system.

It is another object of the present invention to provide data systems with ability to efficiently manage windowed displays.

It is a further object of the present invention to provide data systems in which user-supplied instructions directly effectuate windowed displays with no need for intervening software.

It is an additional object of the present invention to provide data systems in which efficiency is enhanced by retaining the results of intermediate calculations relative to windowed displays.

Other objects and advantages of the present invention will be understood by those of ordinary skill in the art, after referring to the description of the preferred embodiments and the appended drawings wherein:

BRIEF DESCRIPTION OF THE DRAWINGS

FIGS. 2-11 relate to the present invention, wherein:

FIG. 2 is a block diagram of the method of the present invention as practiced on a typical data processing system.

FIG. 3 depicts a single window displayed on a screen.

FIG. 4 depicts a forms descriptor.

FIG. 5 depicts two windows on a screen, one occluding the other.

FIG. 6 depicts a form control record scheme.

FIG. 7 depicts a character font scheme.

FIG. 8 depicts a bit map of a typical character in a character font.

FIG. 9 depicts a display memory subsystem.

FIGS. 10-1 and 10-2 depict the central processing unit of a digital computer system.

FIGS. 11-1 and 11-2 depict the control subsystem of a digital computer system.

DESCRIPTION OF THE PREFERRED EMBODIMENT

Figure 1:
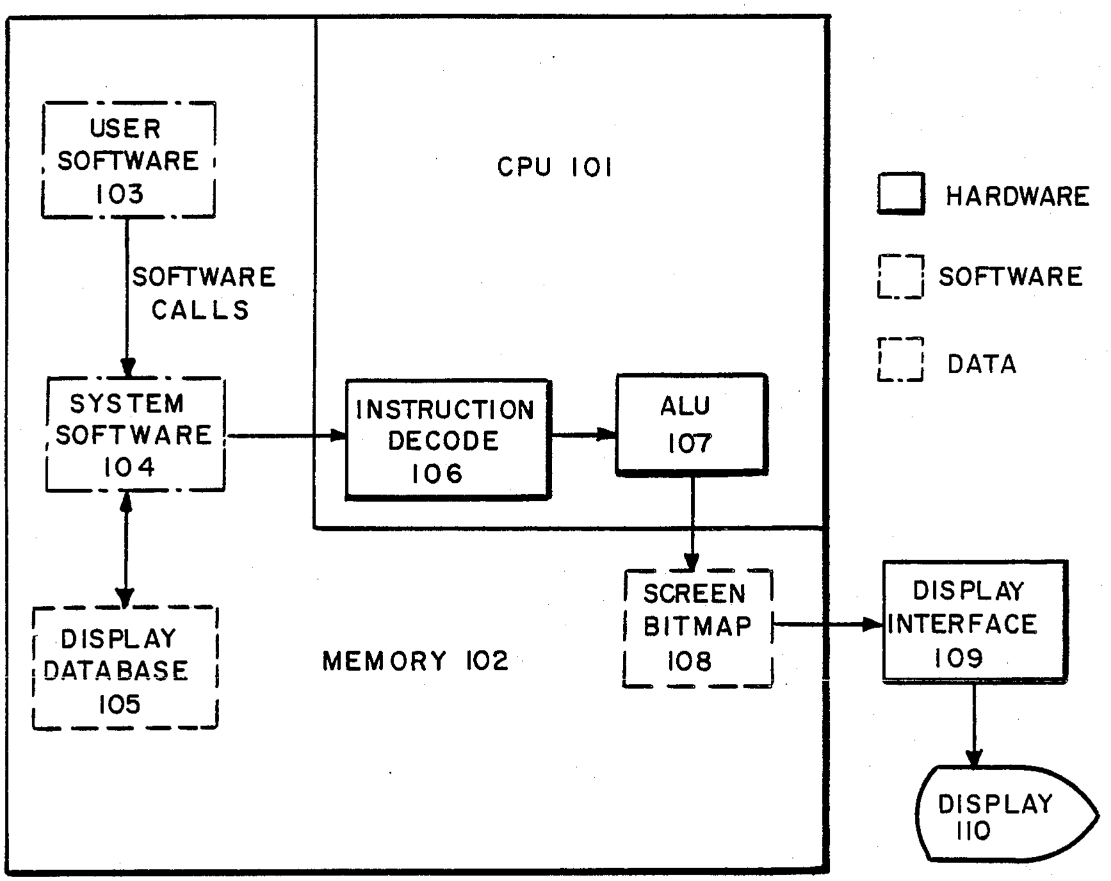
FIG. 1 PRIOR ART
FIG. 1 is an overview of the prior art.

In the prior art, the management of windowed displays has been performed by software. This is illustrated in FIG. 1. (FIG. 1 does not purport to depict a data system in its entirety, but only those elements that are necessary to generate and produce displays.) The system is seen to comprise a central processing unit (CPU 101), a memory (102), a display interface (109), and a display (110). User software 103 (resident in memory 102) may include all manner of software entities, including software calls for display services; such software calls invoke system software 104 (also resident in memory 102) which interprets the user's calls and presents to the CPU instructions which will result in carrying out the requests issued by the user software. The system software may interrogate the display database 105 to determine the previous state of the display, and will update the display database so that it reflects any changes brought about by the current call from user software.

Still referring to FIG. 1, machine language instructions presented to CPU 101 by system software 104 are decoded by element 106 which (regardless of whether by "hard-wired" or microcoded means) directs arithmetic and logic unit (ALU) 107 in executing the instructions. Note that these are all "traditional" instructions (ADD, MOV, etc.) The descriptive information in display database 105 must all be reprocessed in order to create a new screen bit map 108, which would then contain a "screen image" of the display screen as it should now appear, reflecting the manipulations called for by the current calls from user software. Display interface 109 (regardless of whether by programmed I/O or Direct Memory Access means) reads and processes the bit map to generate appropriate signals to display 110 causing it to display the information specified in bit map 108.

Note that the term "bit map" is used herein by convention, and may denote a character map for a character-oriented display, or a pixel map for a pixel-oriented display:

On a character-oriented display, the smallest addressable element is a character position, which may be occupied by any character from a defined font of characters. The selection of which character is to occupy a particular character position is made by placing the binary code representing that character in the corresponding position of the bit map.

On a pixel-oriented display, the smallest addressable element is essentially determined by the size of the "dot" that would be made to appear on the screen by the electron beam if it did not move. (This is termed a "picture element", from which the term "pixel" was coined.) In the simplest pixel bit map, a single bit position in the bit map represents each pixel position on the display; a "1" at a position in the bit map denotes illumination "on" at the corresponding position on the screen, and "0" denotes "off". In more complex implementations, several bits in the bit map represent each pixel position on the display; a combination of several bits at a position in the bit map might denote the intensity level, or the color, or both, to be displayed at the corresponding pixel position on the screen.

The prior art approach can be successfully implemented, but it has the disadvantages of introducing substantial overhead, because of the need to interpret all of the user's calls and because the software is isolated from the bit map by the CPU and is therefore constrained to completely reprocess descriptive information whenever it is desired to change anything on the display. Such implementations have been confined to fairly powerful machines, on which they use up a substantial proportion of the processing power.

The method of the present invention overcomes these disadvantages by enabling the construction of a data system in which special-purpose machine-language instructions are available for manipulating data in windowed displays, above and beyond the traditional instructions (ADD, MOV, and so forth). Since these instructions are directly executable by the CPU, no intervening software is required to interpret them. Since they execute directly in the CPU, which can include a scratchpad memory for encaching descriptive information, there is no need to reprocess descriptive information on every instruction. Thus the method of the present invention uses significantly less of the processing power of a given machine, or permits implementation of windowed displays on a smaller, less powerful machine than is possible for a prior art implementation.

DETAILED DESCRIPTION

Instruction execution and form descriptors

Figure 2:
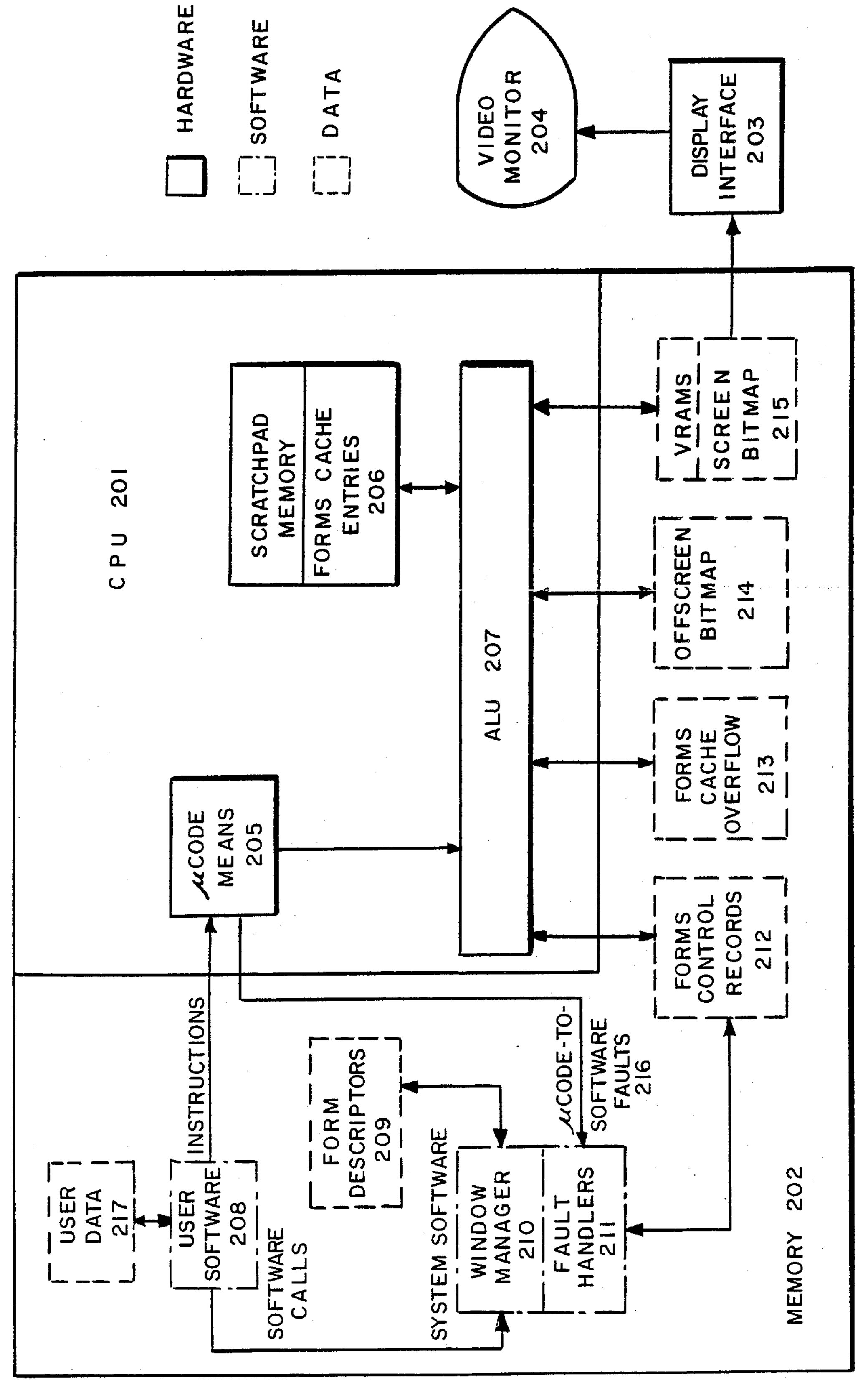
Figures 1, 10:
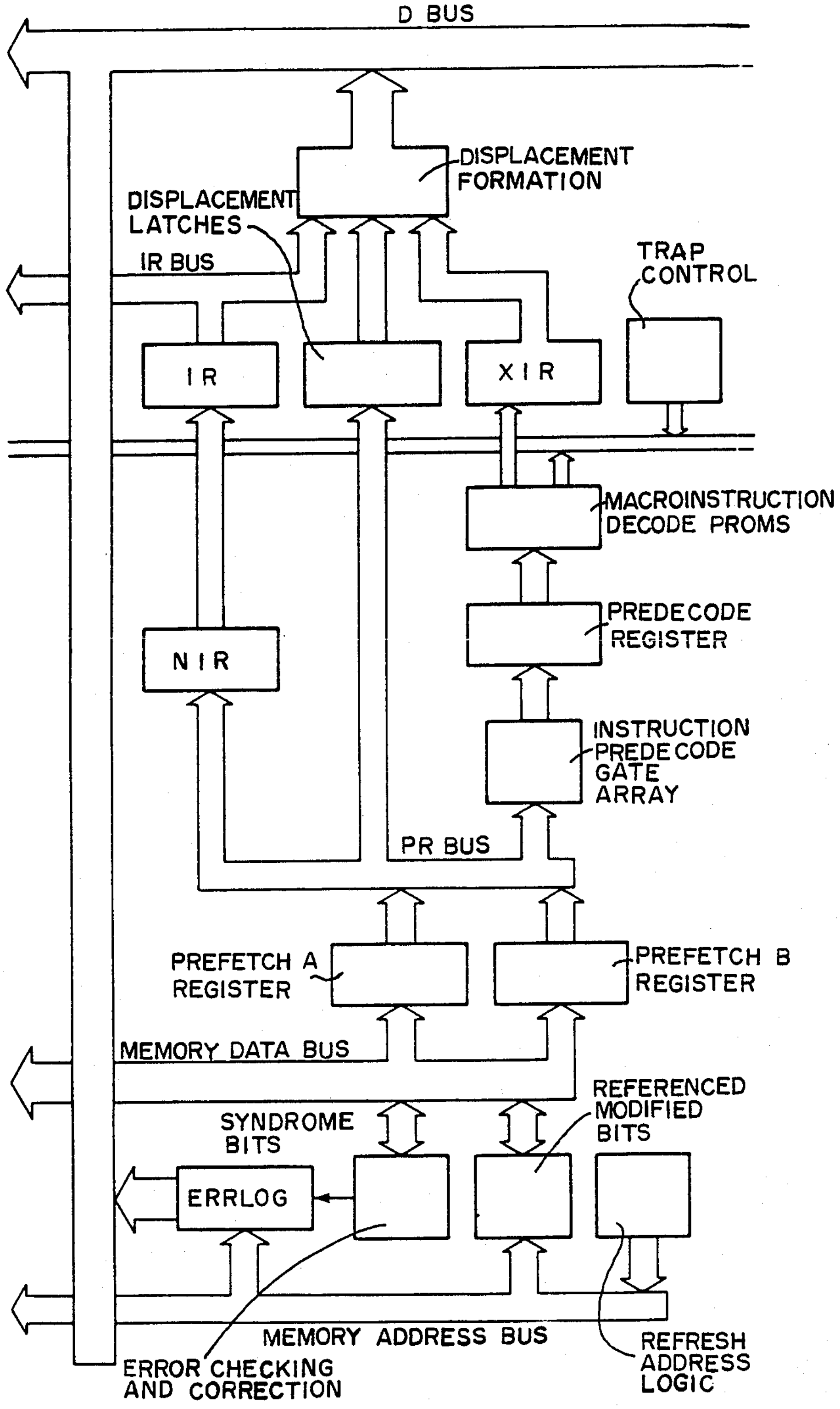
Figures 2, 10:
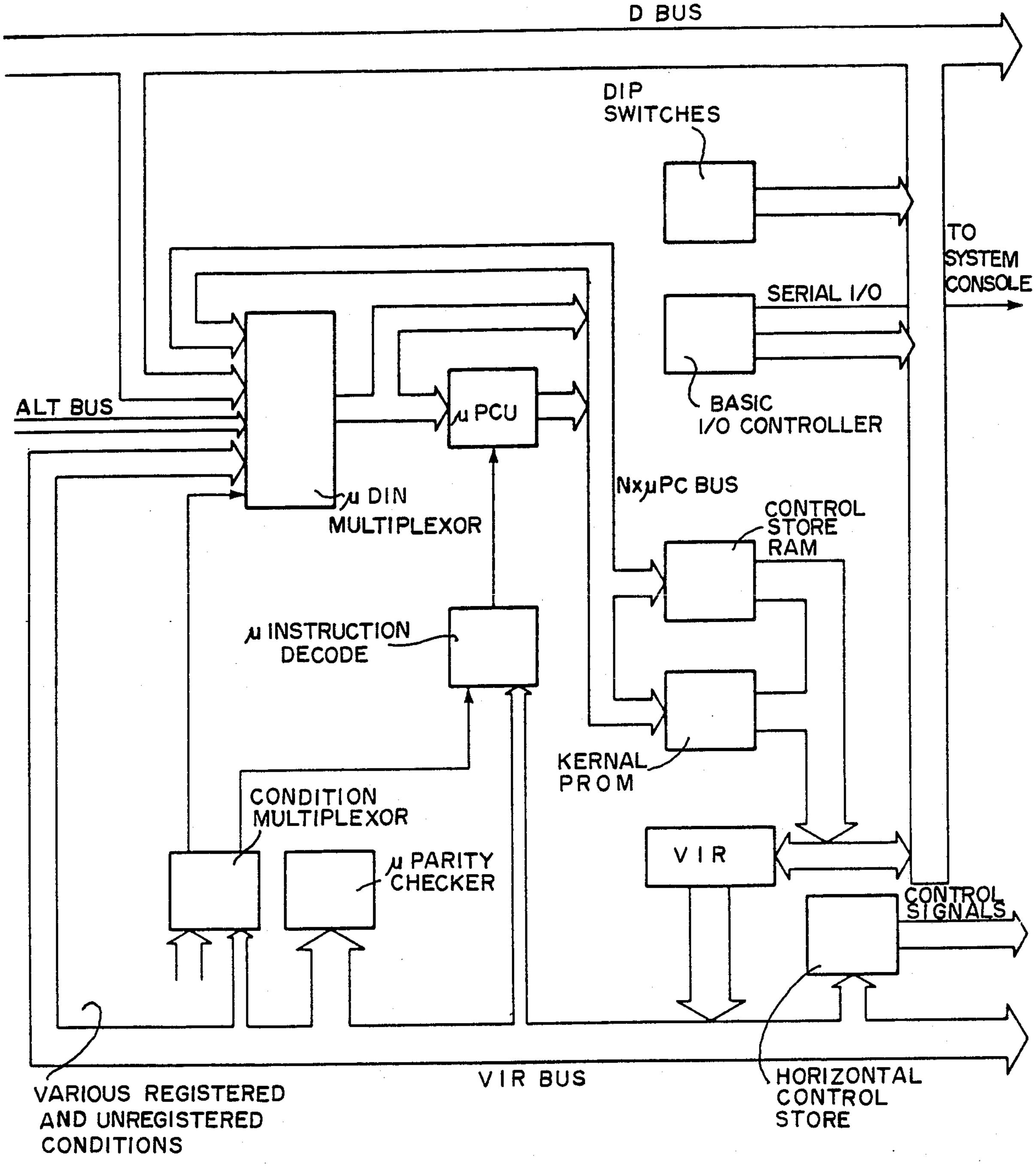
Figures 1, 11:
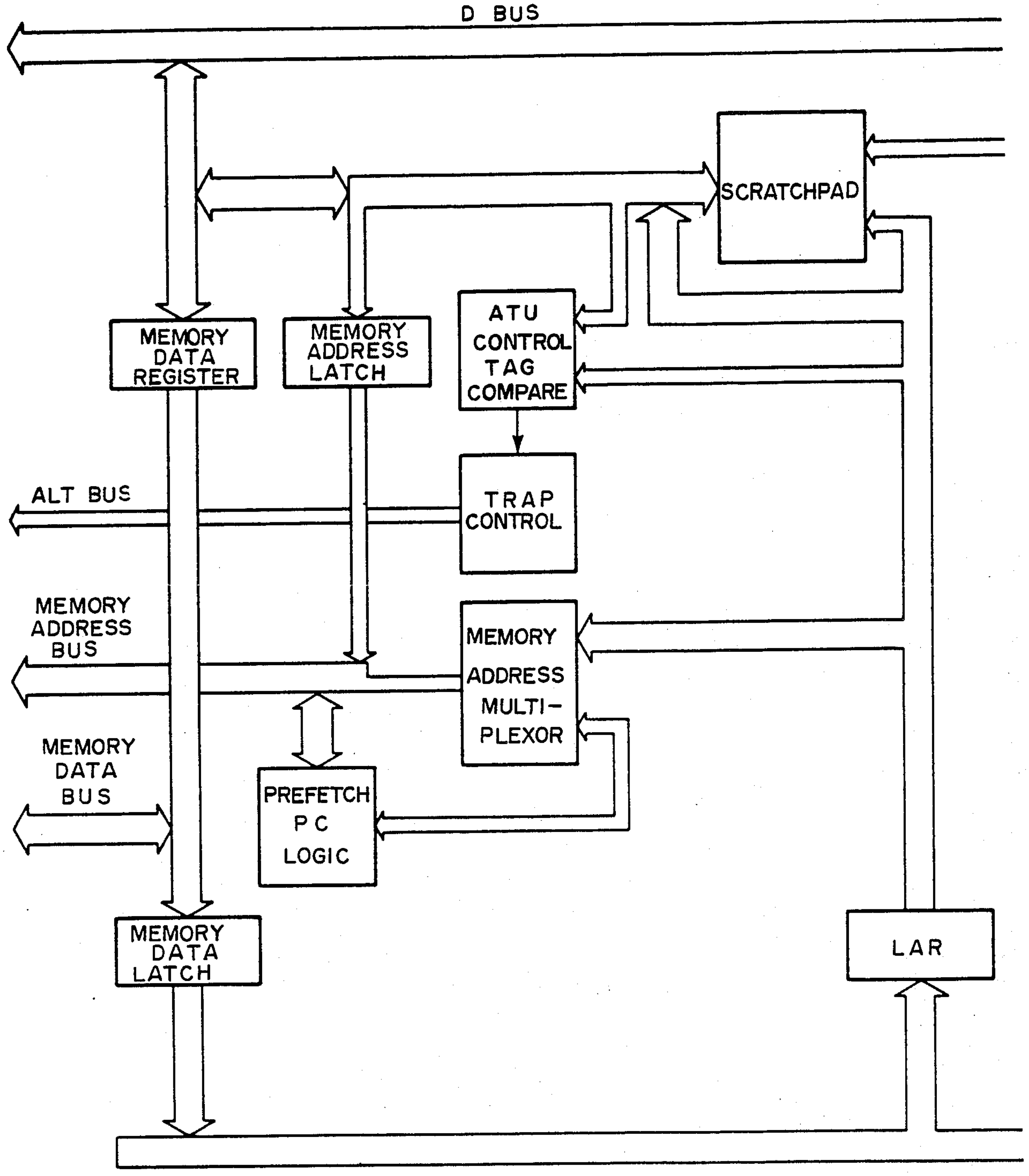
Figures 2, 11:
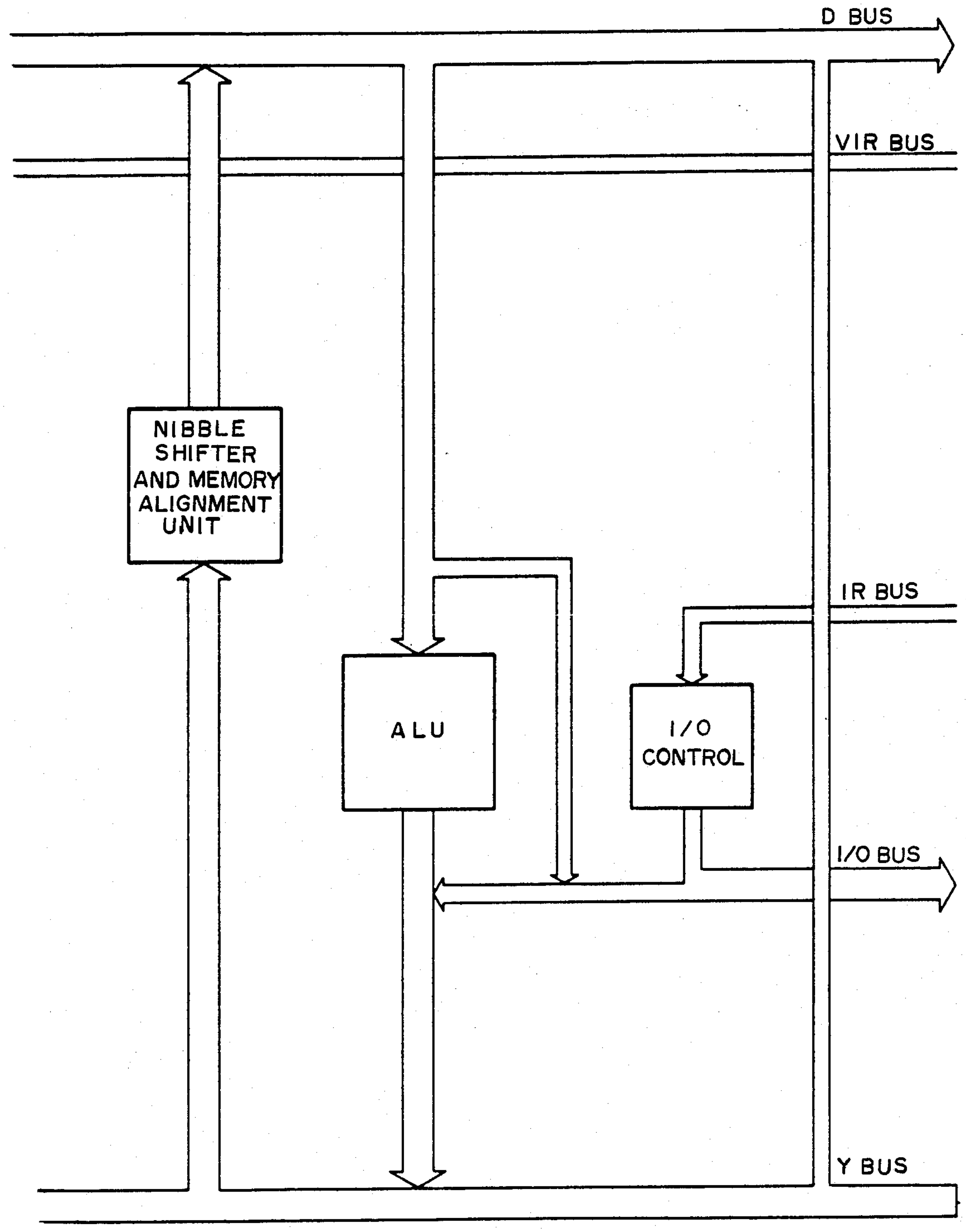

The method of the present invention is depicted in FIG. 2. (FIG. 2 does not purport to depict all elements of a data system, but only those elements necessary to generate and produce displays. All hardware elements of a data system on which the method of the present invention is currently embodied are shown for reference in FIGS. 10 and 11.)

The data system is again seen to comprise a CPU (201), a memory (202), a display interface (203) and a display; in this particular embodiment the display is a pixel-oriented video monitor (204) and not a character-oriented terminal. (Display interface 203 is, of course, an appropriate one to drive a video monitor. Two-bit pixels are employed; for a black-and-white monitor they connote a four-step grey scale, and for a color monitor they connote "Off" (black), "Red", "Green", or "Blue".)

User software 208 is seen not to be constrained to software calls for manipulating the bit map in order to affect displays, but may now also contain instructions which will directly stimulate CPU 201 for that purpose. These are special-purpose instructions and permit CPU hardware to directly construct "screen images" in the bit map, which is inherently far more efficient than manipulating the bit map by means of traditional instructions, to which the bit map is an abstraction.

It is also seen that form descriptors 209 are required. Some definitions are in order at this point:

The attributes of a window (e.g., its height, width, characteristics of what it may contain, etc.) collectively comprise a "form". As windows are manipulated, some may become invisible—but their forms continue to exist.

A data entity containing the data specifying a form is known as a "form descriptor". In order for a window to have existence, a form descriptor must have been provided for it.

Still referring to FIG. 2, it is seen that user software 208 may make software calls to a piece of system software called the window manager (210), which may produce form descriptors. A user may, if she wishes, provide her own form descriptors, but the capability exists to have the window manager provide them for her. This is desirable in a multi-user, multi-program, or multi-process environment to arbitrate among the various users, programs, or processes that are contending for window space on the same physical screen.

Each special display instruction contains a reference to a form descriptor, which the CPU will retrieve as discussed below, and which the CPU will use to modify the effect of the instruction. This enables windowed display management capability to be taken out of software and placed directly into hardware.

Instructions for writing into windows are presented by user software 208 to CPU 201 where they are interpreted by microcode unit 205, which in response to each instruction fetches an appropriate sequence of microinstructions to direct ALU 207 in performing the instruction.

As mentioned, each such instruction contains a reference to a form descriptor. ALU 207 interrogates the forms control records 212 (to be discussed in more detail further on) to determine whether the form descriptor is encached in scratchpad memory 206, or stored in forms cache overflow 213); if the latter, it is retrieved from forms cache overflow 213 and restored to scratch pad memory 206 (possibly displacing another form descriptor, which is saved in forms cache overflow 213); if neither, the form descriptor is retrieved from the list of user-supplied forms descriptors 209, transformed into internal form, and encached in scratchpad memory 206.

Figure 3:
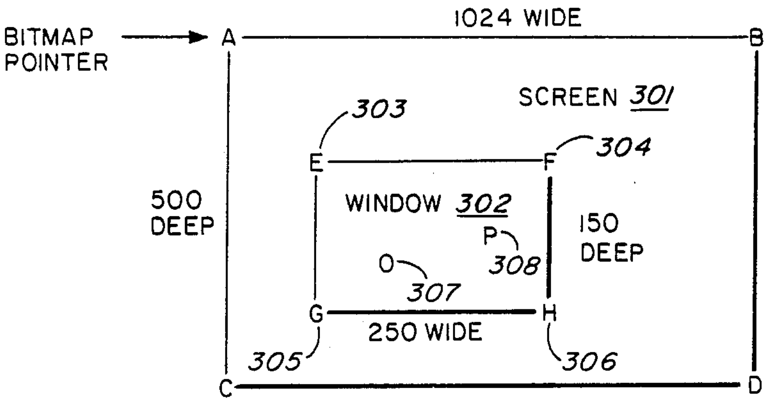

The transformation to internal form consists of calculating screen-global coordinates from window-local coordinates provided by the user in the form descriptor. (The user is not required to know where on the screen her window is located. Also, a window may subsequently be moved around on the screen, and user convenience is enhanced if the user is not required to provide new coordinates for each new position.) Referring to FIG. 3, a window positioned on a screen is depicted. Within the window are a user-specified origin "O" (307) (the user may specify coordinates in the window relative to this origin) and a point "P" (308) at which the user may wish to operate. Listed on FIG. 3 are the global coordinates of the corners of the screen, and the global and local coordinates of points of interest of the window: its four corners, the origin "O", and the point "P". In the user-suppled form descriptor, the user is required to specify the height and width of the window (in pixels), and the local coordinates (relative to the origin "O") of the window's ULC (upper left corner). (Note that this implicitly specifies the location of the origin "O".)

Figure 4:
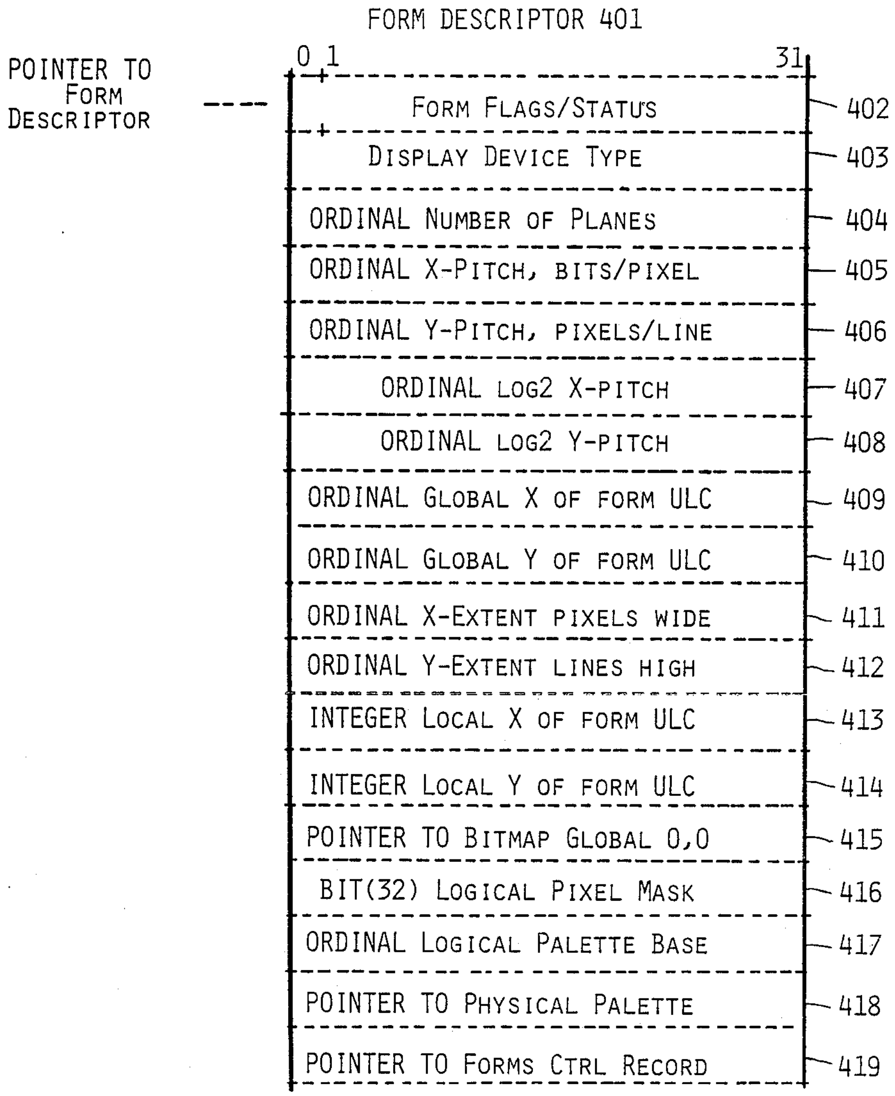

FIG. 4 depicts a form descriptor in internal form. The transformation spoken of consists in calculating and filling in the global coordinates of the window's ULC (409 and 410) and a pointer to global 0,0 (B15). Since the form descriptor can now be encached as a forms cache entry, there is no need to recalculate such information on subsequent references to the same window.

Again with reference to FIG. 3 and FIG. 4, suppose that the user desires to operate a point P (308). The encached form descriptor supplies vectors AE (E's global coordinates 409, 410) and OE (E's local coordinates 413, 414). Instruction inputs supply vector OP (P's local coordinates: XL,YL relative to the origin 307). The vector AP is calculated as part of executing the instruction.

Returning to FIG. 2, the scratchpad memory, then, always contains the transformed versions of the "n" most recently used forms descriptors. This can greatly accelerate execution, since in practice many forms will often be used repetitively. (The determination of the value of "n" is left to the designers of a particular embodiment.)

Since bit map 215 contains an image of what is to be displayed on the screen, execution of the present instruction may be regarded as complete when bit map 215 is updated to contain the new display information specified by the current instruction. Translating the bit map to a visible display is a function of display interface 203, the timing of which is asynchronous to the timing of instruction execution.

ALU 207 may interrogate the previous contents of bit map 215 if the operation called for by the present instruction is a function of the previous display. ALU 207 will write an appropriate new portion of bit map 215 to result in a corresponding new display on video monitor 204.

The method will not permit a user to write outside of the window he has referenced. For example, if a user instruction specified a horizontal line 400 pixels long in a window that is only 200 pixels wide, only that portion of the line that fits within the window is written to bit map 215, and the rest is ignored. This is known as "clipping". In order to inform the user that clipping has been performed, a carry indication is returned to her upon completion of the instruction.

Note that bit map 215 is contained in VRAM's (video random access memory chips). The VRAM's are accessible to the ALU just as any other portion of main memory. What is different about the VRAM's is that they possess a special provision for rapid unloading to display interface 203, as will be discussed later in the Display Memory section.

OCCLUSION: ("BROKEN WINDOWS")

Figure 5:
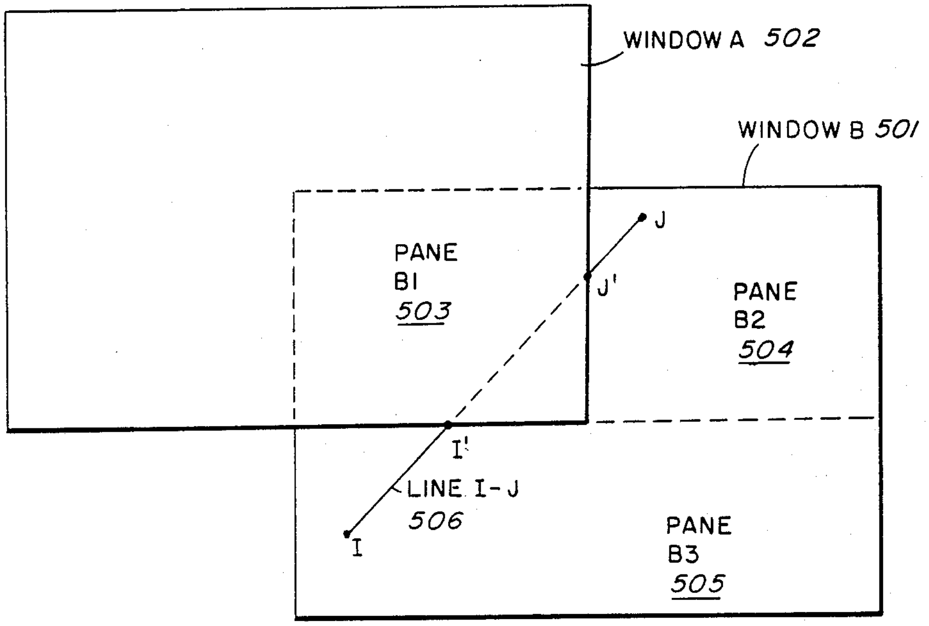

A complication occurs in the described processing when a window is occluded (partially covered) by another window. Referring to FIG. 5, it is seen that Window A (502) is partially covering Window B (501). Prior to this occlusion, the processing was able to regard Window B as a single entity, but must now regard it as a complex entity made up of several simple entities—Panes B1, B2, and B3. (The term "pane" denotes a portion of a window.) In order to keep the simple entities as simple as possible, the constraint is imposed that panes must always be rectangular—i.e., the method does not allow consideration of the occluded rectangle and the L-shaped remainder, but requires division of the L-shaped remainder into two rectangles, B2 and B3.

The user of window B is not required to know that this occlusion has occurred (it may have been caused by a different user, program, or process), and hence does not bear the burden of providing form descriptors for the panes—the method does this automatically and in a manner that is transparent to the user. A form descriptor describing a rectangle is known as a "simple form descriptor". (The form descriptors provided by the user, describing entire windows, are simple form descriptors.) When occlusion requires breaking a window into panes, the processing will automatically create new simple form descriptors for the panes, and will create a "complex form descriptor" for the window. In future embodiments this automatic creation may take place under control of microcode, but in the present embodiment it is done by software, invoked by the microcode-to-software fault capability, to be discussed further on, which invokes fault handlers 211.

Figure 6:
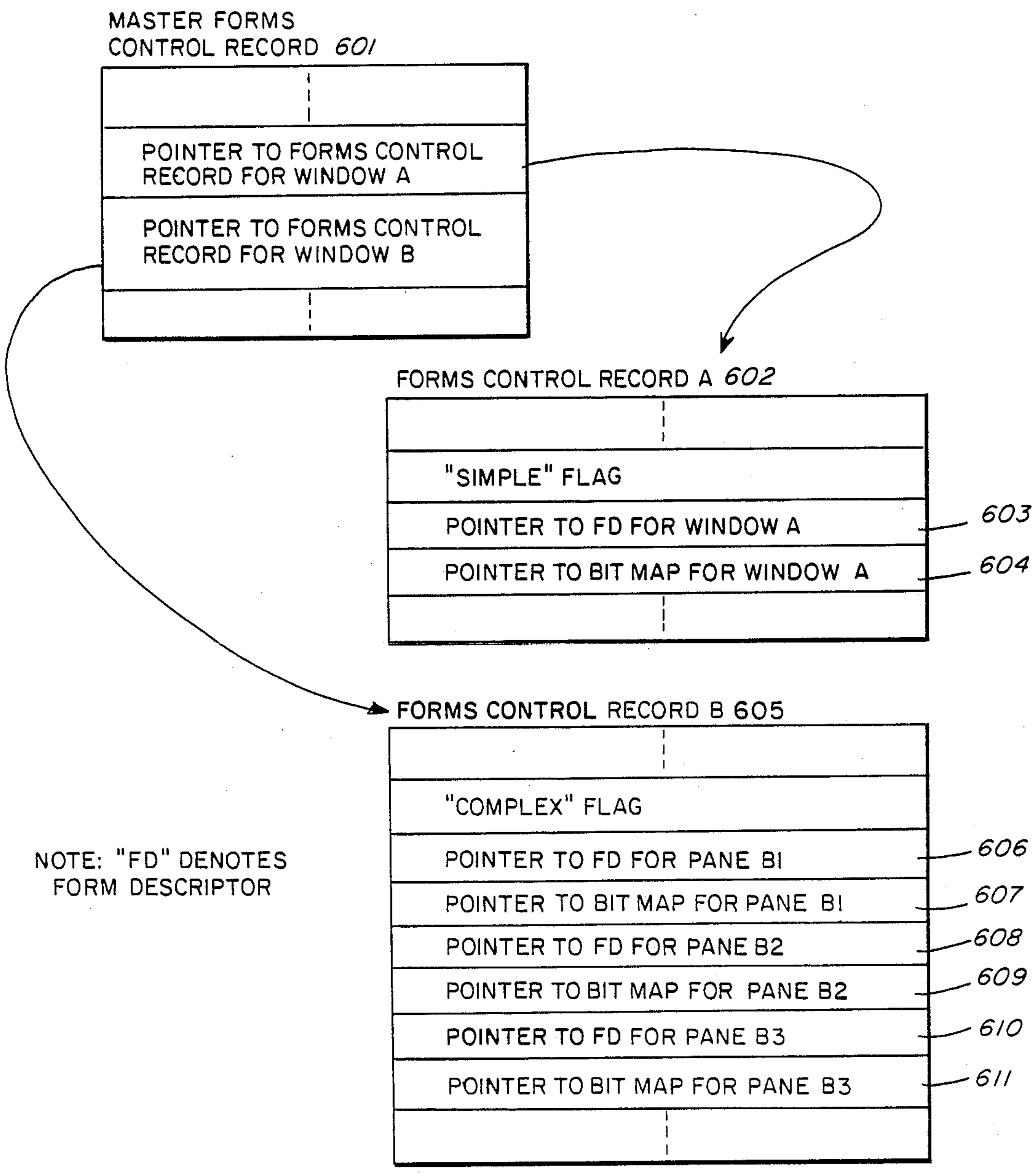

A complex form descriptor for a window essentially comprises a list of pointers to the simple form descriptors for the panes making up that window. In the current embodiment, these pointers exist in forms control records 212. Another use of the forms control records is to keep track of the locations of bit maps of panes and windows. When a pane becomes occluded, the data that were displayed on it are not be displayed any longer, indicating that the corresponding locations in bit map 215 will be overwritten by the data for the occluding window. Rather than discard this information, which would necessitate recomputing it later when the pane is to become visible again, or when the user wishes to manipulate data within the pane (recall that it is possible to manipulate data in an invisible pane), it is retained as an "off-screen bit map" (214) in main memory. Referring to FIG. 6, which depicts the forms control records entries that reflect the occlusion situation depicted in FIG. 5, it is seen that Master Forms Control Record 601 contains pointers to forms control record A (602) and B (605) (for windows A and B). Forms control record A points to form descriptor A and to window A's bit map (the location within bit map 215 where the information for window A is stored).

Prior to occlusion, window B's form control record structure was similar to the structure just described for window A. Upon detecting the occurrence of occlusion, however, the processing makes up new form descriptors for panes B1, B2, and B3; moves pane B1's bit map data from bit map 215 to off-screen bit map 214; and makes up a new form control record 605, which contains pointers (606, 608, and 610) to the three new form descriptors, and pointers to B1's off-screen bit map (607), B2's bit map (609), and B3's bit map (611).

Subsequent user instructions to manipualte window B can now be handled. For example, (referring to FIG. 5) if the user specifies a line from I to J in window B, processing will automatically translate that to three requests: one for line I-I' in pane B3, one for line I'-J' in pane B1, and one for line J'-J in pane B2. (For simplicity, the three requests might each call for the full line I-J, and the clipping function previously described would result in writing in each pane only the segments that fall within those panes.) Handling these three requests will, as usual, result in recording the line in the bit maps for the three panes. However, since pane B1 is presently occluded, line I'-J' is written into the off-screen bit map and will not presently be visible on the display. Subsequent removal of window A will result in reconstituting the simple form descriptor for window B, discarding the complex form descriptor for window B and the simple form descriptors for panes B1, B2, and B3, and moving pane B1's bit map information from the off-screen bit map 214 to bit map 215; thus the complete line I-J will become visible even though part of it was invisible when drawn.

The described interception of the request to draw the line I-J and resolving it into three requests may in future embodiments be performed by the CPU under microcode control, but in the present embodiment it is performed by software invoked by microcode-to-software fault 216.

MICROCODE-TO-SOFTWARE FAULT

Microcode-to-software fault is the mechanism that permits taking complex issues out of microcode and into software in the current embodiment while leaving the way clear to construct improved future embodiments with more functions performed by microcode. It also provides a guide for implementation staging and for migration of functionality up and down.

When an operation initiates, microcode must determine whether it can do the operation, and whether it can deal with the forms on which it must operate. If the answer is no in either case, the microcode must "fault" (or "escape") to software. A fault handler address is supplied as part of each instruction. Thus, there can be a plurality of fault handlers.

The fault handler will emulate the requested operation, subdividing forms if necessary (as described above), and using more primitive instructions if necessary. The invoking program is resumed via the WPOPJ instruction of the Data General 32-bit instruction set. Recursive faults are thus supported implicitly.

The combination of faulting mechanism, clipping, and window-local coordinate systems gives a unique benefit: a display-affecting operation on a complex window is equivalent to the same operation applied in turn to all constituent simple windows. The user is thus relieved of responsibility for complex windows.

Displayable Data Types

Depending on the particular instruction (see Appendix A) operands denoting what the user to wishes to write in her windows may be immediate operands (contained in the instruction), or the instruction may contain a pointer to data outside the instruction (element 217 in FIG. 2). Explanation of various data types is here provided.

Linestyles

Linestyle is a way of drawing other than solid lines. Specified as a bit string of length 32, it controls which pixels computed during line drawing are actually to be planted. For each draw position, the leftmost bit in the linestyle is examined. If set, the pixel is planted; if clear, no change occurs. The linestyle is rotated left one bit position, and the next draw position is computed. Examples of linestyle (expressed in hexadecimal) are:

| | |
|---|---|
| FFFFFFFF: solid | AAAAAAAA: somewhat grey |
| F0F0F0F0: almost dotted | FFF0FFF0: long dashes |
| FFFF0FF0: long/short dashes | FFFFF060: dash-dot |
| 88888888: very faint | FFFF0660: dash-dot-dot |

Fonts

Figure 7:
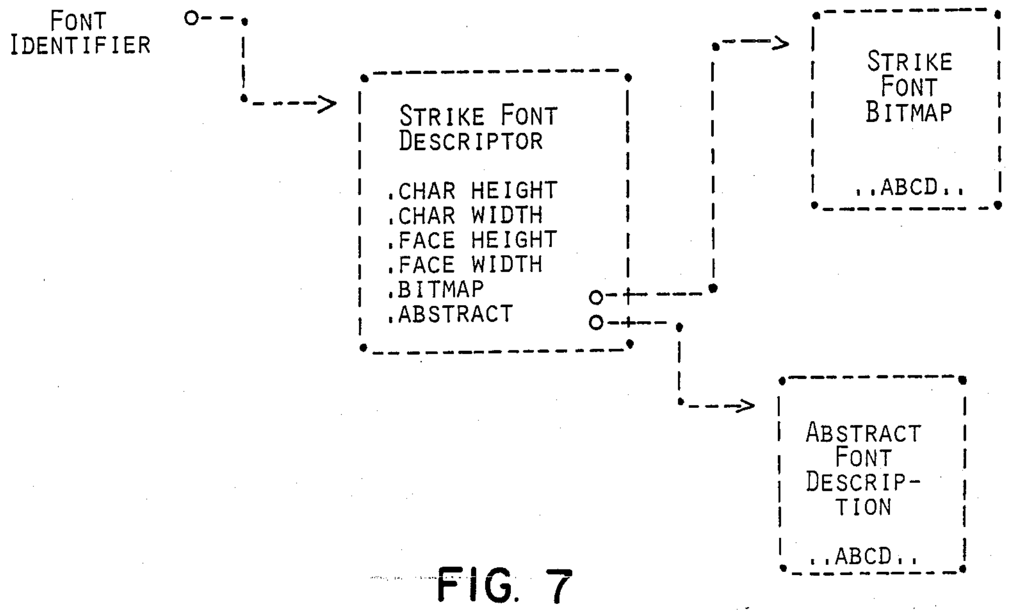

Fonts are sets of special forms that are used by character-drawing operations. They are descriptions of how each individual character is to be drawn. This description (not necessarily in bit map form) must be translated into actual screen-relevant format before drawing can occur. Conditioning for character height and width must be performed. Alignment and padding may also be required. This latter entity is a "strike font". Character instructions deal in strike fonts specified by denoting a Strike Font Descriptor. FIG. 7 depicts this scheme.

Figure 8:
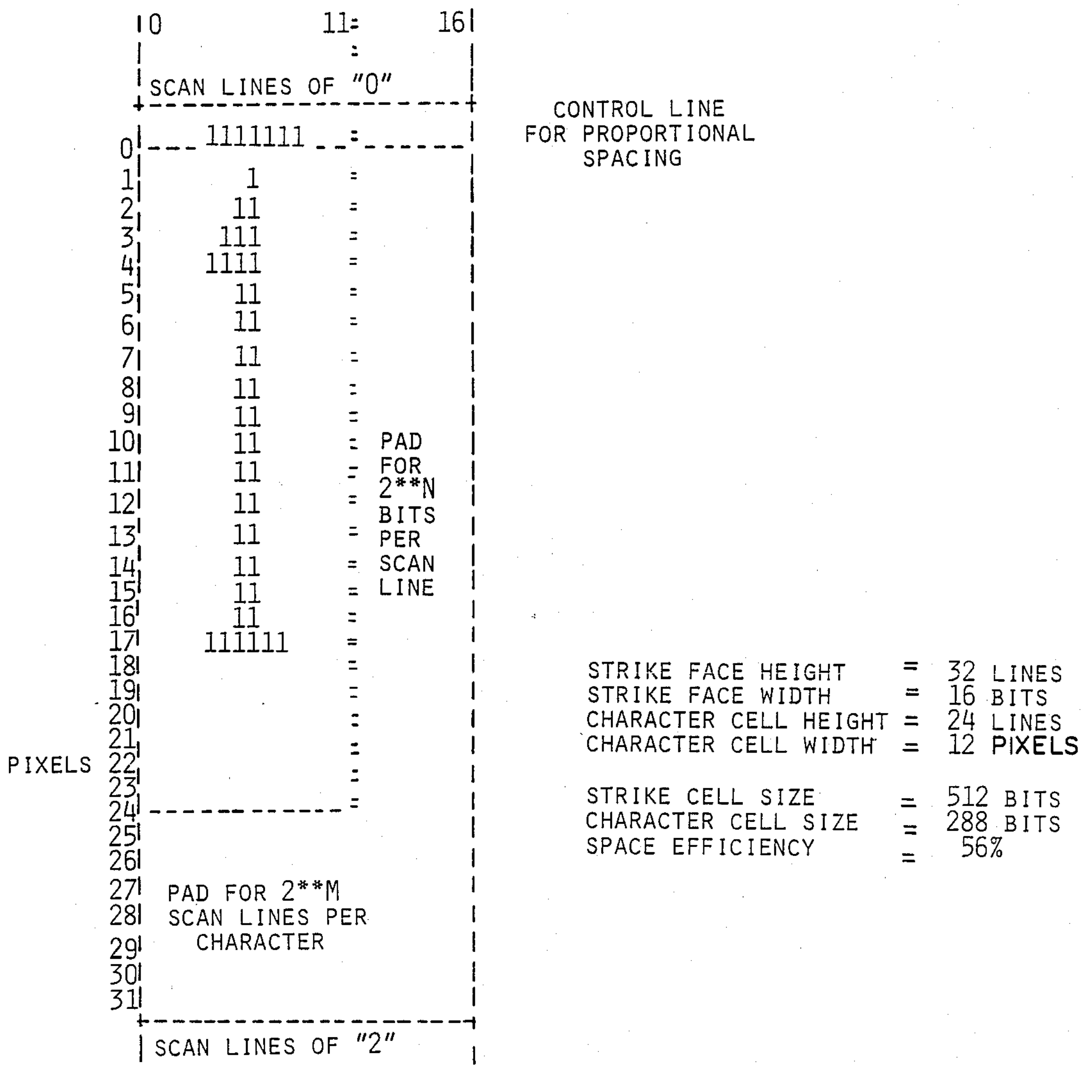

A font organization has been chosen that uses one bit per pixel. Scan lines are padded to a power-of-two number of bits, and occupy successive memory locations. Each scan line must start on a boundary equal to its width. The number of scan lines must also be a power of two. All characters in a font occupy the same amount of space, implicitly a power-of-two number of bits. The.

first scan line of a strike cell is not drawn. It identifies with ONE's those columns which make up the proportionally spaced subset of the cell. FIG. 8 shows the layout of a 12×24 strike font entry for the character "1".

Character drawing is controlled by a linestyle-like process. Conceptually, a character drawn by "strip mining" its strike font entry row-wise. Each bit of the row is examined in turn, ignoring in proportional spacing mode those columns with ZERO's in the control line. If 1, then a drawing-colored (foreground) pixel is sourced. If 0, a background-colored pixel is sourced instead.

Sourced pixel values are subjected to print control; foreground and background pixels can be suppressed independently. This allows for trial spacing (no printing at all), drawing characters on an existing background, and drawing characters and background simultaneously (all subject to further combination rules outlined below). A 2-bit print style is defined:

| Foreground Suppress | Background Suppress | Printing Effect Font = 1 → foreground pixel Font = 0 → background pixel |
|---|---|---|
| 0 | 0 | Plant all pixels of cell |
| 0 | 1 | Plant foreground pixels only |
| 1 | 0 | Plant background pixels only |
| 1 | 1 | Plant nothing, just count space |

Combination Rules

Many of the instructions will employ a Combination Rule to deal with superposition of source pixels on destination pixels. One does not always wish strictly to replace the destination pixel with the source pixel; it may be desired to plant a pixel whose value is some function of source and destination. This implies that destination may also be an input.

A scheme has been adopted in which is specified a single BOOL-rule and a mask that applies to logical pixels. The bits of the logical pixel corresponding to 0s are unchanged in the target form; those corresponding to 1s are combined according to the BOOL-rule. The logical pixels are already only the rightmost bits of a physical pixel.

Access Methods

By way of defining the instructions, graphics practice reveals that certain "favorite" operations are performed frequently, including:

*reading or writing a pixel's value
*moving a rectangular area of pixels around.
*drawing a line or series of connected line segments.
*filling an polygonal area with a pattern.
*drawing a string of ASCII characters.

These operations comprise three major methods of drawing on a display: pixels, figures, and characters.

Character Access Method

This method provide ways to plant text in a window. The Character Block Transfer (CHARBLT) instruction allows for arbitrary font specification in translating ASCII character strings to their pixel representations. It also checks for characters that may require special handling.

Figure Access Method

Drawing a line is an important part of technical computer graphics. It is used in CAD/CAM packages, architectural design packages, and business graphics packages. Since this operation is performed so often, special instructions are provided. Both continuous (LINESEG) and incremental (BRESENHAM_STEP) forms of line drawing are included. Lines can be drawn closed, half-open, or fully open. The actual algorithm must be reversible so as to make things such as line erasure precise. A line width argument has been included to support this function at the low level.

Pixel Access Method

This access method deals with individual pixels and rectangular areas of them. It can serve as the foundation of higher-level accessing methods, so that users can create their own display manipulation instructions (for image manipulation, conic section generation, etc.) Read Pixel and Write Pixel operators allow direct access to pixels. Although only these two operations are strictly necessary to do the job, higher level operations are much more common.

These are the only drawing instructions that do not take a combination rule specifier. They are intended as the simplest of all building blocks. The model of use is one of many WRPIXELs to the same form in rapid sequence.

A Bit Block Transfer operator is a very useful pixel-level operator. It is essentially a rectangular combination and assignment function. This is done especially when scrolling windows, moving windows around, and creating and destroying windows that obscure other windows. A special rectangular fill operation is also useful for dealing with clearing screens and repartitioning windows.

BITBLT is the only operation that takes two forms, since certain restrictions are placed on source and target forms. Source logical pixels will be padded or chopped to conform to the target form's parameters.

Instruction Repertoire

All display-affecting instructions share a·common instruction stream format. The first 16-bit word of all such instructions is octal 107151 (hexadecimal 8E69, Nova ADDOL#2,0,SKP). The next two 16-bit words hold a program counter-relative offset (nonindirectable), of a software emulator/fault handler. The fourth 16-bit word contains a small, unsigned integer subopcode that specifies the particular function to be performed.

| Primary GIS Opcode 107151 octal | Displacement to Emulator Code | Secondary Sub-opcode for function |
|---|---|---|
| 0 15 | 16 31 32 47 | 48 63 |

| | |
|---|---|
| RDPIXEL (Read Pixel) | 0 |
| WRPIXEL (Write Pixel) | 1 |
| RDAL (Read Palette Entry) | 2 |
| WRPAL (Write Palette Entry) | 3 |
| LINESEG (Draw Line Segment) | 4 |
| BITBLT (Bit Block Transfer) | 5 |
| CHARBLT (Write Characters) | 6 |
| PFORMS (Purge Form Cache) | 7 |

NOTE: "GIS" = "Graphics Instruction Set"

A full delineation of the repertoire of display-affecting instructions is found in Appendix A.

Display Memory Modules

The screen bit map (215 on FIG. 2) is maintained in a special area of main memory known as display memory or video memory. An embodiment of video memory for a black-and-white monitor is now described.

Figure 9:
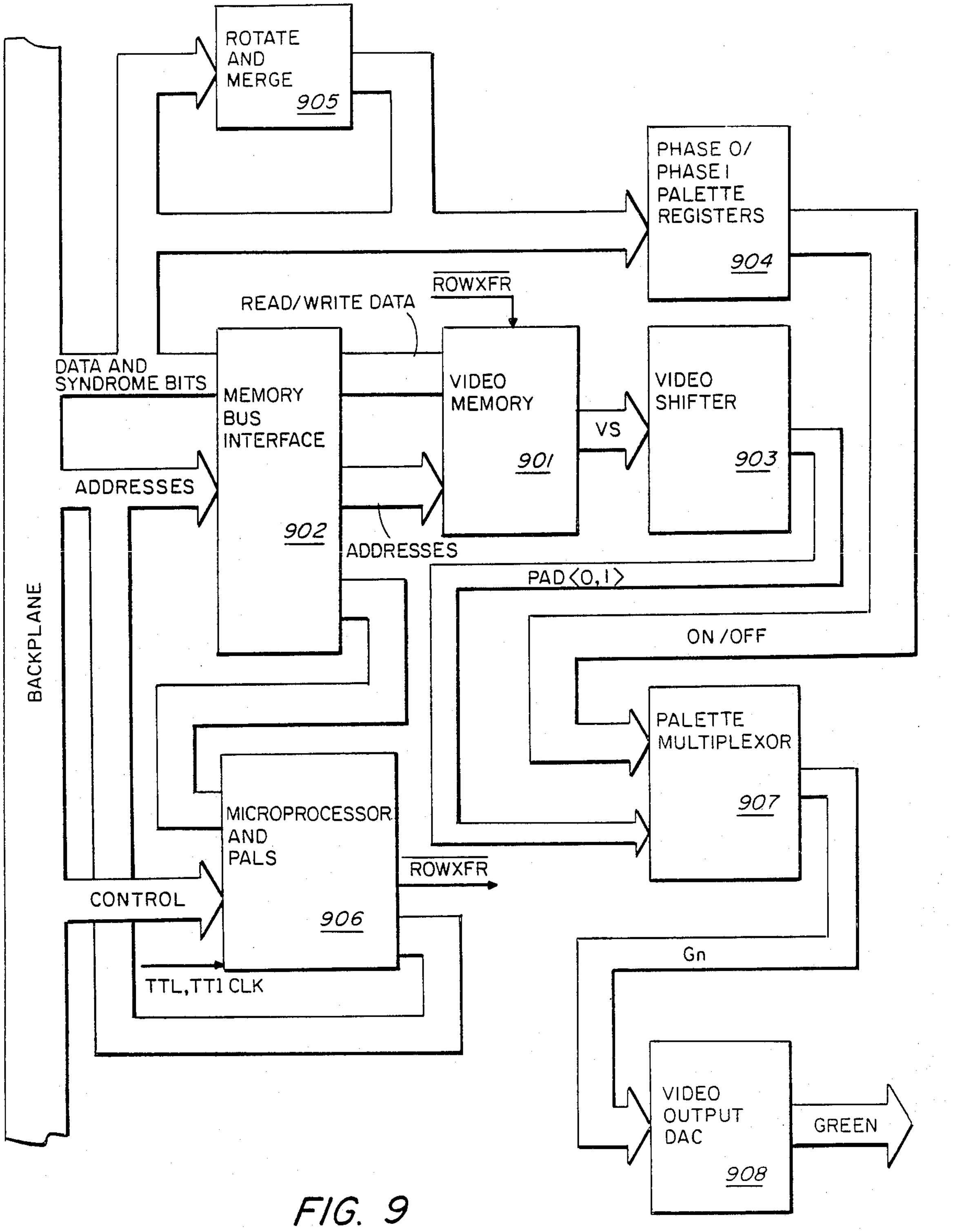

Referring to FIG. 9, video memory 901 is composed of thirty-two 64K Video RAMs (VRAMs) and is organized into a 1024×1024×2 space, permitting two-bit-pixel representation of a screen 1024 pixels high by 1024 pixels wide. RS-343A monitor timing allows display of the entire array. A free-running blink clock selects one of two complete palettes (904) capable of mapping any pixel value to one of four levels of gray (0=black to 3=white). Palette I/O and other local operations are transacted through "Graphics Space", actually encoded as the IOC Auxilliary Processor (AP) Communication channel. In order to support the "Register-Transfer" function peculiar to VRAMs and additional diagnostic and boot-time character drawing, display memory timing and control logic will arbitrate for the memory bus as a requestor through memory bus interface 902.

Video Memory Proper

The 64K double-word (i.e., 32-bit) video memory is manipulated by the CPU as normal system memory. The screen is generated from a logical bit-map packed within a linear array of double-words which are ordered in the classical sense of left-to-right and top-to-bottom. Two bit pixels will be packed left-to-right with their msb's toward the double-word msb.

Texas Instruments VRAM random access cycles are essentially identical with those of standard DRAMs. Their unique characteristic is the ability to transfer an entire 256 bit row of internal storage to a serial shift register (903) in one special access. This register may then be clocked independently of further random access activity. Additional controls allow multiplexing four 64 bit sections of this row register to aid in configurability.

Timing and Control

Dot and CRT timing will be derived from a local oscillator operating at approximately 44 MHz. Due to the independent nature of VRAM serial clocking, no explicit synchronization with existing memory timing, other than the arbitration for register-transfer cycles, is required. A specific VRAM row and mux address sequence must be maintained to properly refresh the interlaced display. Relatively simple multiplexing will be all that is required to pass pixel values to the palette. The above capabilities are optimally satisfied by an intelligent micro-controller (uC) (906), the Intel 8051 being the best choice in that minimal cost and CEQs will result, although an 8031/2732 EPROM implementation may be utilized in future embodiments.

Rotate and Merge Logic 905

In the course of analyzing the microcode necessary to implement the BITBLT instruction, a need was noted to accelerate graphics memory references on arbitrary bit boundaries. Consequently, the hardware required to implement this function as a Memory-Bus-resident device was developed. A control bit specifies the direction of the merge sequence. A "merge-enable" bit is also available in order not to preclude a circular "rotate-only". All references are made via Graphics Space UABAs.

The Palette & DAC

The present embodiment uses a pixel value as simply an index into a palette. A palette is a special hardware map, which translates pixel values to (digital) beam intensities. Instructions exist to set and retrieve pixel-to-color translations. The palette is organized as a 4×2×2 array arranged within a single double-word of storage. Two-bit palette data written through the AP Graphics Space will encode the desired gray level to be associated with a given pixel value for each phase of the blink clock in palette multiplexer 907. Although direct reading of this register is not available, microcode will maintain an image of it in a single scratchpad location. The EDH13400 DAC (digital-to-analog converter 908) will be utilized to produce the analog composite-video signal. Red, Green and Blue outputs are available; for the monochrome monitor the signal will be forwarded on the Green output. The DAC not only performs sync-mixing, but is capable of direct 75-Ohm drive, and will be available in a 24-pin, 600 mil ceramic package.

Blinking

The present embodiment provides a "blink clock". It toggles the palette with a 50% duty cycle at a fixed rate of about 1.0–1.5 Hz. Thus, there are two palettes, one for each phase of the Blink Clock. Entries in the two palettes are specified separately. This allows a user to program a given Pixel Value to alternate between two levels of intensity (or two colors on a color display.) The chart below shows some of the effects possible using this palette scheme for two-bit pixels. Individual palette entries specify four intensities as 32-bit unsigned binary fractions between zero and one.

| Pixel Value | Phase-0 Palette | Phase-1 Palette | visual effect |
|---|---|---|---|
| 00 | black | black | off |
| 01 | dim white | dim white | dim |
| 10 | white | white | on |
| 11 | black | white | blink |

Monitor Characteristics

In that RS-343A video is provided, a 19" off-the-shelf monitor is used. The sync-on-green analog interface will be cabled directly via coax from backplane pins to the monitor BNC connector.

MEMORY PROGRAMMING

UABA Encodings

The following table summarizes the display memory UABA Encodings which will be supported by graphics microcode:

| FUNCTION | API | APID0,1 | BCMD0,1 | IOC Equivalent |
|---|---|---|---|---|
| Command WR | 1 | 01 | 00 | "Instruction to IOC" |
| Status RD | 1 | 01 | 00 | "Instruction to IOC" |
| [unused ] | 0 | 01 | 00 | "Data to IOC" |

-continued

| FUNCTION | API | APID0,1 | BCMD0,1 | IOC Equivalent |
|---|---|---|---|---|
| Palette WR | 0 | 01 | 01 | "Data from IOC" |
| Skew Reg WR | 0 | 00 | 10 | "Microcode to IOC" |
| Merged Data RD | 0 | 01 | 11 | "Abort IOC" |

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX A

INSTRUCTION DICTIONARY

RDPIXEL [107151,000000]

This instruction reads a single pixel from a form and returns its value masked to the form's logical pixel width. If the specified pixel is outside the boundaries of the form, then no value is returned. Instead, a clipping indication is returned in Carry.

INPUTS

AC0: ignored
AC1: INTEGER local X-coordinate
AC2: INTEGER local Y-coordinate
AC3: POINTER TO Form Descriptor

OUTPUTS

AC0: ORDINAL Logical Pixel Value (if in form)
  unchanged (if point not in form)
AC1: unchanged
AC2: unchanged
AC3: unchanged
C: SET if [X,Y] not in Form, unchanged otherwise.

WRPIXEL [107151,000001]

This instruction plants a pixel value in a form, masking it to the form's logical pixel width and biasing it by the form's logical palette base.

INPUTS

AC0: ORDINAL Logical Pixel Value
AC1: INTEGER local X-coordinate
AC2: INTEGER local Y-coordinate
AC3: POINTER TO Form Descriptor

OUTPUTS

AC0: unchanged
AC1: unchanged
AC2: unchanged
AC3: unchanged
C: SET if [X,Y] not in Form, unchanged otherwise.

METHOD (1) Start with the Logical Pixel Value from AC0.
(2) AND it with the Form's Logical Pixel Mask to remove any stray high order bits.
(3) OR in the Form's Logical Palette Base to turn local color into global color.
(4) Plant the Physical Pixel Value at [X,Y]

LINESEG [107151,000004]

This instruction draws a single line segment. The control packet contains four items that are updated for restartability: X- and Y-offsets, epsilon, and the rotated linestyle specifier.

INPUTS

AC0: POINTER TO Endpoint 1 [X,Y] pair
AC1: POINTER TO Endpoint 2 [X,Y] pair
AC2: POINTER TO LINESEG Packet
  .INTEGER X-delta (for restart)
  .INTEGER Y-delta (for restart)
  .INTEGER Epsilon (for restart)
  .BIT(32) Linestyle (updated)
  .BIT(32) Operation Mask
  .BIT(32) Control Word:
    .BIT(O1) Suppress Endpoint 1
    .BIT(01) Suppress Endpoint 2
    .BIT(26) Filler, must be zero
    .BIT(04) Combination Rule
  .ORDINAL Pixel Value for Drawing
  .ORDINAL Line Width
AC3: POINTER TO Form Descriptor

OUTPUTS

AC0: unchanged
AC1: unchanged
AC2: unchanged
  X-delta in packet updated
  Y-delta in packet updated
  Epsilon in packet updated
  Linestyle (rotated) in packet updated
AC3: unchanged
C: SET if clipping occurred, unchanged otherwise

CHARBLT [107151,000006]

This instruction plants characters in a form using glyphs held in a Font. The data manipulated by CHARBLT fall into four categories: string data, font data, form data, and other operational parameter. Accordingly, this instruction takes pointers in all 4 ACs. It also is the only one of the initial GIS to take a skip return on final (sic) completion.

INPUTS

AC0: POINTER TO String Packet
  .BYTEPOINTER TO Character String (1-origin)
  .ORDINAL Maximum Index into String
  .ORDINAL Starting Index in String (updated)
AC1: POINTER TO CHARBLT Packet
  .INTEGER X-start (restart value, updated)
  .INTEGER Y-start (restart value, updated)
  .ORDINAL X-delta (initially 0, updated)
  .ORDINAL Y-delta (initially 0, updated)
  .ORDINAL Foreground (drawing) Pixel Value
  .ORDINAL Background Pixel Value
  .BIT(32) Operation Mask
  .BIT(32) Control Word
    .BIT(01) Suppress Foreground
    .BIT(01) Suppress Background .BIT(01) Space Proportionally
.BIT(25) Filler, must be zero
.BIT(04) Combination Rule
.POINTER TO Exception Bit-Vector
AC2: POINTER TO Font Descriptor
.ORDINAL Height of character cell (in lines)
.ORDINAL Width of monospace character cell
.ORDINAL Strike font cell width (in bits)
.ORDINAL Strike font cell height (in lines)
.POINTER TO Strike Front Bitmap
AC3: POINTER TO Form Descriptor

OUTPUTS

AC0: unchanged (string index updated in packet)
AC1: unchanged (X-start, Y-start, X-delta, Ydelta updated)
AC2: unchanged
AC3: unchanged
C: SET if any clipping occurred, unchanged otherwise
PC: Set to PC+4 if string denoted by AC0 exhausted. Otherwise, execution skips to PC+5 if a character exception is indicated by a 1 in the bit vector (like CMT) denoted through AC1.

METHOD (1) If XDELTA, YDELTA not both zero then resume character drawing from interrupt point within character.

(2) For each character in the string starting at SINDEX, repeat the following steps:

(3) Fetch current character, STRING[SINDEX], and call it C.

(4) If EXCEPTIONS [C] is 1 then "done" and skip, PC:=PC+5;

(5) Locate the strike font cell for C's glyph. The first bit is at the offset given by the product of the integer value of the character, the strike cell width, and the strike cell height.

(6) If proportional, use the first scan line as a control mask, ignoring columns corresponding to 0s in the mask. The number of 1s is therefore the width of the particular character in proportional spacing. If monospace, ignore the first line.

(7) Scan the lines of the font entry, determining and planting foreground and background pixels as described in GIS.002, under control of the operation mask, print control, and combo rule.

(8) Bump XSTART by character width and SINDEX by one.

(9) If SINDEX>MAXINDEX then done at PC:=PC+4, else repeat.

(10) When done, SINDEX=MAXINDEX+1, and XDELTA and YDELTA are both zero.

BITBLT [107151,000005]

Pixels starting from the ULC of the Source Rectangle in the Source Form are paired with pixels starting at the ULC of the Target Rectangle of the Target Form. Consistent with the boundaries of both forms, source and target pixels are (optionally) combined and the target pixel replaced.

This must be done in such a way that no target pixel is modified before it is used as a source pixel, since source and target boxes may overlap. BITBLT never smears pixels the way that WCMV smears characters. BITBLT must choose the correct direction for walking the two rectangles.

INPUTS

AC0: ignored
AC1: POINTER TO BITBLT Packet
.INTEGER X-delta (initially 0, for restart)
.INTEGER Y-delta (initially 0, for restart)
.POINTER TO Source Start ULC Specifier
.POINTER TO Target Start ULC Specifier
.ORDINAL X-extent (in pixels)
.ORDINAL Y-extent (in pixels)
.BIT(32) Operation Mask
.BIT(32) Combination Rule (low 4 bits)
AC2: POINTER TO (Source) Form Descriptor
AC3: POINTER TO (Target) Form Descriptor

OUTPUTS

AC0: unchanged
AC1: unchanged (X-delta, Y-delta updated)
AC2: unchanged
AC3: unchanged
C: SET if clipping occurred, unchanged otherwise

RDPAL [107151,000002]

This instruction retrieves the contents of a palette entry for a particular pixel value within the context of a given form. It reflects the actual intensities stored in the palette, rather than the values that were input to a prior WRPAL (Write Palette).

INPUTS

AC0: ORDINAL Logical Pixel Value (relative to Form)
AC1: POINTER TO Phase 0 RGBL-Tuple
.BIT(32) Red Intensity (ignored)
.BIT(32) Green Intensity (ignored)
.BIT(32) Blue Intensity (ignored)
.BIT(32) Grey-Level (ignored)
AC2: POINTER TO Phase 1 RGBL-Tuple
.BIT(32) Red Intensity (ignored)
.BIT(32) Green Intensity (ignored)
.BIT(32) Blue Intensity (ignored)
.BIT(32) Grey-Level (ignored)
AC3: POINTER TO Form Descriptor

OUTPUTS

AC0: unchanged
AC1: unchanged, POINTER TO Phase 0 RGBL-Tuple
.BIT(32) Red Intensity (undefined if mono)
.BIT(32) Green Intensity (undefined if mono)
.BIT(32) Blue Intensity (undefined if mono)
.BIT(32) Grey-Level (undefined if color)
AC2: unchanged, POINTER TO Phase 1 RGBL-Tuple
.BIT(32) Red Intensity (undefined if mono)
.BIT(32) Green Intensity (undefined if mono)
.BIT(32) Blue Intensity (undefined if mono)
.BIT(32) Grey-Level (undefined if color)
AC3: unchanged

METHOD (1) The physical palette unit is identified using the unit designation cell of the form descriptor.

(2) The logical pixel value input in AC0 is masked with the Logical Pixel Mask of the form denoted by AC3.

(3) The actual physical palette index is computed by ORing the Logical Palette Base from that same form descriptor.

(4) The RGBL-tuples returned reflect the actual resolutions of the implementation.

(5) Color implementations render L-slots undefined; Monochrome implementations render RGB-slots undefined.

(6) Blink-less implementations render Phase-1 tuples undefined.

WRPAL [107151,000003]

This instruction sets up palette entries for both phases of the blink clock (if one exists). It allows color and grey-level to be specified independently. It is assumed that control software sets up the target form's Palette Base and prevents abuse of the WRPAL.

INPUTS

AC0: ORDINAL Logical Pixel Value (relative to Form)
AC1: POINTER TO Phase 0 RGBL-Tuple
.BIT(32) Red Intensity (ignored if mono)
.BIT(32) Green Intensity (ignored if mono)
.BIT(32) Blue Intensity (ignored if mono)
.BIT(32) Grey-Level (ignored if color)
AC2: POINTER TO Phase 1 RGBL-Tuple
.BIT(32) Red Intensity (ignored if mono)
.BIT(32) Green Intensity (ignored if mono)
.BIT(32) Blue Intensity (ignored if mono)
.BIT(32) Grey-Level (ignored if color)
AC3: POINTER TO Form Descriptor

OUTPUTS

AC0: unchanged
AC1: unchanged
AC2: unchanged
AC3: unchanged

METHOD (1) The physical palette unit is identified using the unit designation cell of the form descriptor.

(2) The logical pixel value input in AC0 is masked using the Form Mask found in the form descriptor denoted by AC3.

(3) The physical palette index is computed by ORing the indicated form's Logical Palette Base to the masked pixel value.

(4) Non-color implementations ignore RGB intensities; color implementations ignoret grey-level.

(5) RGBL values are truncated on the right to internal palette resolution.

(6) Blink-less implementations ignore Phase-1 color.

PFORMS [107151,000007]

This function performs the form cache equivalent of PATU (Purge the ATU) or SPTE (Set Page Table Entry). LSBRS and LSBRA (Load Some/All Segment Base Registers) may also invalidate associations of logical address to form descriptor information. Thus PFORMS must also occur as an implicit consequence of executing any of the above instructions.

INPUTS

AC0: ignored
AC1: ignored
AC2: ignored
AC3: POINTER TO Form Descriptor

OUTPUTS

AC0: unchanged
AC1: unchanged
AC2: unchanged
AC3: unchanged

What is claimed is:

1. A method for controlling the displays of a digital computer system, the system comprising:

main memory means for storing machine language instructions and data;

processing means for performing operations on data in response to the machine-language instructions, said processing means including a scratchpad memory;

display means for displaying representations of data; the method comprising the steps of:

(a) identifying a form descriptor to said processing means, said form descriptor for describing organization of data to be displayed;

(b) identifying a machine language instruction to said processing means, said machine language instruction specifying first data and specifying representations of first data which are to be displayed, and for describing the position within the organization described by the form descriptors at which the representations of the first data are to be displayed;

(c) determining whether or not said form descriptor is stored in internal form in either the scratchpad memory or said main memory means;

(d) transforming said form descriptor to internal form, if necessary;

(e) transferring the form descriptor in internal form into the scratchpad memory if it is not already there;

(f) calculating, in the processing means, second certain data determined by said machine-language instruction, said form descriptor in the scratchpad memory and certain first data specified by said machine-language instruction, the second certain data being a representation of what is to be displayed; and (g) forwarding the second certain data to the display means for representations of the second certain data to be displayed.

2. The method of claim 1, wherein in step f) the second certain data is further determined from previous second certain data, in addition to being determined from said machine language instruction, said form descriptor, and certain first data specified by said machine language instruction.

3. The method of claim 1 wherein said scratchpad memory comprises means for storing data significantly more rapidly than in the main memory means, and means from which data can be retrieved significantly more rapidly than from the main memory means.

4. The method of claim 1 wherein a sequence of microinstructions currently controlling the processing means may relinquish control of the processing means and direct that the processing means be placed under control of a sequence of machine-language instructions from a plurality of sequences of instructions provided in the main memory means.

5. The method of claim 1 wherein:

if in step (f) it is determined that said machine-language instruction has specified that certain portions of the data representations displayed on the display means are to become obscured or occluded by other data representations, the portions of the second certain data coresponding to the certain portions of the data representations are removed to a retention area within the main memory means; and wherein:

if in step (f) it is determined that said machine-language instruction has specified that certain portions of the data representations that previously became obscured or occluded are again to become visible, the corresponding portions of the second certain data are restored from the retention area;

whereby there is no need to recompute those portions of the second certain data.

6. The method of claim 1 wherein:

if in step (f) it is determined that a first certain selected form descriptor delimits a portion of the second certain data already delimited by a second certain selected form descriptor, and if in step (f) it is further determined that the second certain selected form descriptor also delimits a portion of the second certain data not delimited by the first certain selected form descriptor:

resolving the second certain specified form descriptor into subform descriptors:

a first subform descriptor delimiting the portion of the second certain data delimited by both the first certain and second certain selected form descriptors; and one or more next subform descriptors delimiting the portion of second certain data delimited by the second certain selected form descriptor but not by the first certain selected form descriptor.

7. The method of claim 6 wherein:

if in step (f) it is determined that said form descriptor has previously been resolved into subform descriptors:

resolving a function of said machine-language instruction, said form descriptor, and certain first data specified by said machine-language instruction into:

a function of said machine-language instruction, the subform descriptors, and certain first data specified by said machine-language instruction.

8. The method of claim 6 wherein:

if in step (f) it is determined that a portion of the second certain data that was previously delimited by two or more form descriptors becomes delimited by only one form descriptor:

discarding subform descriptors delimiting that portion of the second certain data.

* * * * *